United States Patent [19]

Zorn

[11] Patent Number: 5,099,649
[45] Date of Patent: Mar. 31, 1992

[54] APPARATUS FOR COOLING A GLOVE COMPARTMENT IN A MOTOR VEHICLE

[75] Inventor: Manfred Zorn, Alten-Buseck, Fed. Rep. of Germany

[73] Assignee: Coleman (Deutschland) GmbH, Hungen, Fed. Rep. of Germany

[21] Appl. No.: 749,177

[22] Filed: Aug. 23, 1991

[30] Foreign Application Priority Data

Aug. 23, 1990 [DE] Fed. Rep. of Germany ....... 4026678

[51] Int. Cl.⁵ .......................................... F25B 21/02
[52] U.S. Cl. ...................................... 62/3.61; 62/244; 62/457.9; 62/3.6
[58] Field of Search ................ 62/457.9, 3.61, 3.6, 62/3.3, 244, 3.5

[56] References Cited

U.S. PATENT DOCUMENTS 4,637,222 1/1987 Fujiwara et al. ..................... 62/244
5,042,258 8/1991 Sundhar ........................... 62/457.9

Primary Examiner—Albert J. Makay
Assistant Examiner—John Sollecito
Attorney, Agent, or Firm—Fleit, Jacobson, Cohn, Price, Holman & Stern

[57] ABSTRACT

An apparatus for cooling a glove compartment in a motor vehicle is described, in which a Peltier element serves as a cooling unit for cooling the interior of a glove compartment. The latter contains a flexible bag, which is made from a material with a very low thermal conductivity and surrounds the cooling space within the glove compartment.

10 Claims, 1 Drawing Sheet

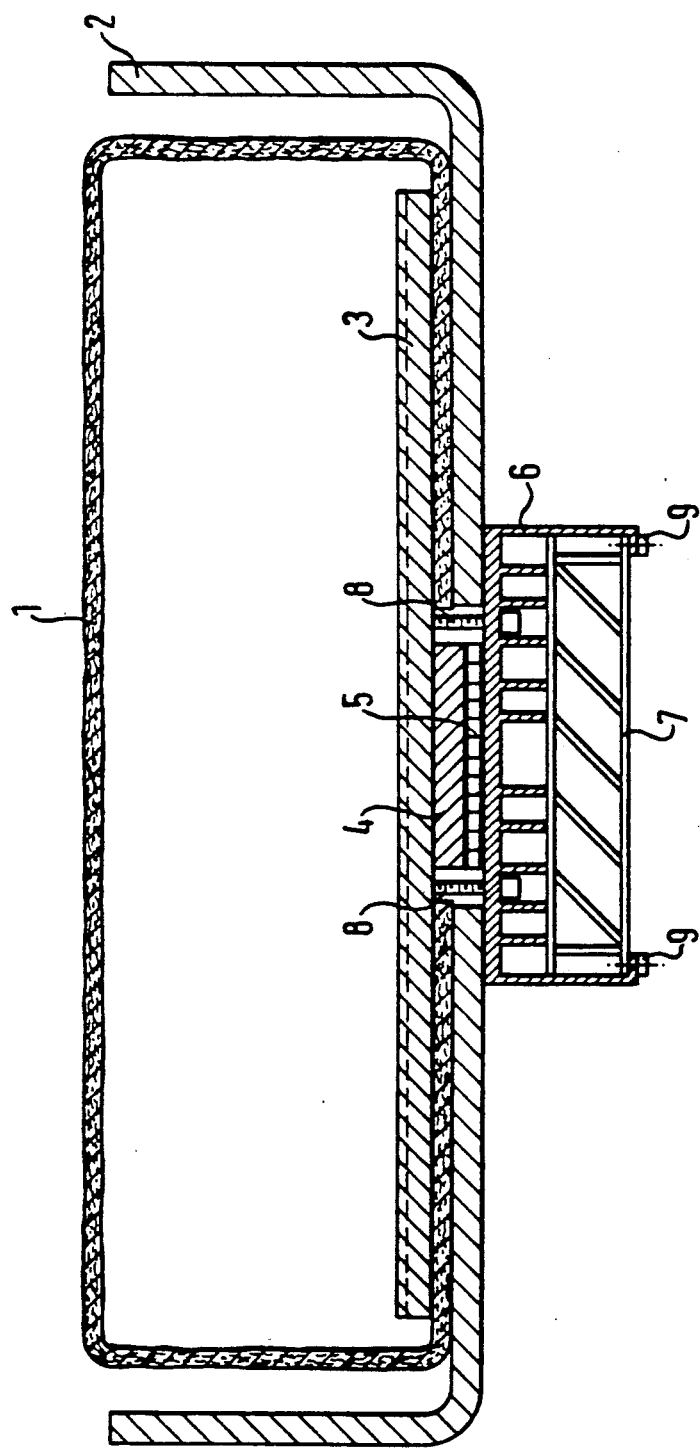

APPARATUS FOR COOLING A GLOVE COMPARTMENT IN A MOTOR VEHICLE

BACKGROUND OF THE INVENTION

The invention relates to an apparatus for cooling a glove compartment in a motor vehicle. Such an apparatus is known from DE-OS 37 39 151, which describes a vehicle cooling box positioned in a glove compartment. This cooling box is cooled by means of an air inlet, which is connected to the cold air outlet of the air conditioner of an air conditioning unit located in the vehicle. The cooling box has an air outlet for the escape of the air which has flowed through the cooling box. It has a trough-like construction and on the vehicle instrument panel above a glove compartment folding shutter is provided a cover, which closes the top of the cooling box when the folding shutter is closed. This known cooling box can only be used in a vehicle, which already has an air conditioning system.

DE-OS 30 19 092 also discloses a small electric cooler for a drinks or beverage container with Peltier elements, which is in thermal contact with its cold surface for a corresponding flow direction with a heat conducting element located in the thermally insulated interior, so that said element is constructed as a top-open cup with an inside dimension suitable for the positive reception of the larger lower part of standard beverage containers. The cold side of the Peltier block is connected to a finned heat exchanger enabling air to be blown into the cooling box for cooling purposes by means of a fan.

DE-OS 36 39 089 discloses a thermoelectric cooling device, particularly for motor vehicle cooling boxes, with a thermoelectric cold generator comprising at least one Peltier block. The hot side of this Peltier block is in heat conducting contact with a first heat exchanger through which flows a forced coolant. The cold side of the cold generator is in heat conducting connection with a second heat exchanger constructed as a finned heat exchanger for cooling a forced circulated medium, which is passed through a flow duct in the vicinity of the ribbed heat exchanger and whose full cross-section is received by the latter. A liquid coolant flows through the first heat exchanger and is forced circulated in a liquid circuit and is provided with a third heat exchanger in the form of an air/liquid heat exchanger for cooling the liquid coolant.

SUMMARY OF THE INVENTION

On the basis of the aforementioned prior art, the object of the invention is to provide a cooling apparatus of the aforementioned type enabling a particularly effective glove compartment cooling to take place for a very limited technical cooling effort and expenditure.

According to the invention this object is achieved in that a flexible bag is placed in the interior of the glove compartment, that the walls of the flexible bag have a very limited thermal conductivity, that the bag has a substantially heat-tight-closable opening, that a plate made from a material with high thermal conductivity is placed in the bag and that the plate is in the thermal contact with a Peltier element.

The invention leads to the essential advantage that also in a motor vehicle not equipped with an air conditioning system, the interior of a glove compartment can be effectively cooled. It is particularly advantageous for the occupants of a vehicle, particularly the driver, that a cooled area is present for storing food or drinks and which is also accessible from the driver's seat. It is particularly advantageous for the cooling area to be formed by a flexible bag, which is to a certain extent size-variable.

A particularly advantageous embodiment of the flexible bag which, according to the invention, surrounds the actual cooling space can be modified by a corresponding folding together of the bag. Thus, the volume of the cooled space can be adapted to the product to be cooled, which ensures that cooling is particularly effective and energy is saved. If the external dimensions of the cooled space can be adapted to the cooled product dimensions, as in the present invention, no unnecessary volume has to be kept at a minimum temperature. The very variable and flexible design of the cooling space size can e.g. also be achieved in that the flexible bag has flaps, which are correspondingly folded over one another to ensure the desired cooling space shaping and which are fixed to one another by burr closures or fastenings.

The invention also leads to the decisive advantage that if the flexible bag is not needed it can be folded up flat, so that the interior of the glove compartment can substantially completely be used for other purposes.

A particularly advantageous further development of the invention is provided if the bag walls are made from a material with a high thermal protection. If the material used for manufacturing the bag already has particularly good thermal protection characteristics, the energy requirement for cooling purposes can be kept very low. It is advantageous for the bag walls to be made from foam material, which ensures a good thermal insulation.

Advantageously the bag walls can have a closed-pore layer, in which honeycomb cells are placed between several material layers. The invention also allows the use of a material which brings about a good thermal insulation less through the actual material characteristics than through the structure.

If according to a further advantageous embodiment of the invention the bag is constructed so that it can be folded flat, virtually the entire interior of the glove compartment is available for other purposes, if there is no need for the low temperature storage of drinks, food, etc.

A particularly large volume for a cooled space is obtained according to an advantageous development of the invention, in that in the unfolded open state the bag takes up essentially the entire interior of the glove compartment.

An advantageous development of the invention is characterized in that the plate is arranged along a glove compartment wall and between the plate and said wall is fixed a bag wall. Advantageously the plate extends substantially over the entire inner surface of said bag wall, which is positioned along the glove compartment wall and is fixed by said plate to said glove compartment wall. This leads to an arrangement only taking up a minimum amount of space in the glove compartment, so that virtually none of the interior of the compartment is lost if the flexible bag is folded up. Simultaneously a very simple construction is obtained for the fitting of the inventive cooling apparatus in the vicinity of the glove compartment.

Preferably the plate is made from aluminium, which has a high thermal conductivity. In order to be able to effectively dissipate the heat from the flexible bag surrounding the cooling space, preferably the hot side of the Peltier element is connected to a cooling plate located outside the glove compartment. If a particularly good cooling action is desired, it is possible to assist the heat dissipation from the cooling plate by a fan.

BRIEF DESCRIPTION OF THE DRAWING

The invention is described in greater detail hereinafter relative to the drawing, which is a section through a glove compartment equipped with a cooling apparatus according to the invention.

DESCRIPTION OF THE PREFERRED EMBODIMENT

According to the drawing a flexible bag 1 is placed in a purely diagrammatically shown glove compartment 2. The flexible bag 1 is shown in its unfolded open position, in which it fills substantially the entire interior of the glove compartment 2. Naturally the arrangement could also be such that e.g. only half or another part of the glove compartment was filled by the flexible bag in the completely unfolded open state.

The closure of the flexible bag is not shown. It is obvious that a very good heat-tight closure is required to avoid energy losses. Flaps provided with burr closures, which can be folded over one another in a very variable manner are particularly advantageous, to on the one hand surround a size-variable cooling space and on the other to permit a good thermal insulation.

One wall of the bag 1 is arranged along a wall of the glove compartment 2 and namely between the said compartment wall on the one hand and a plate 3 on the other. The plate 3 is preferably made from aluminium, which has very good heat conductivity characteristics. The surface of the said plate preferably has 1 to 2 mm high longitudinal ribs, in order to offer a maximum surface to the interior of the bag 1. To the plate 3 is connected a rectangular metal plate 4, which on its side remote from the plate 3 is connected to one effective area (cold side) of a thermoelectric Peltier element 5. The other effective area (hot side) of the Peltier element 5 is connected to a cooling plate 6 made from extruded aluminium.

The plate 3 and the cooling plate 6 are interconnected with the aid of screws 8, which are passed through the cooling plate 6. Insulating bushes made from a low thermal conductivity material are placed between the screws 8 and the cooling plate 6. The screws 8 firmly press the plate 3 against the wall of the glove compartment 2 and the wall of the bag 1 is secured between the plate 3 and said wall of the compartment 2.

As a result of a skilful and space-saving construction, a particularly large surface of the plate 3 is created in the flexible bag 1. At the same time the latter is given a certain dimensional stability in the vicinity of a glove compartment wall and said bag 1 is fixed in a clearly defined, stable manner at a predeterminable point within the interior of the glove compartment.

Thus, the plate 3 has a multiple function in that, apart from its cooling function, it also permits the shaping and positional fixing of the bag 1.

A fan 7, fixed with four screws 9, for speeding up the necessary cooling air is inserted in the cooling plate 6, whose surface is designed in such a way that a maximum heat dissipation is achieved. In order to fit the cooling apparatus according to the invention, it is merely necessary to make a relatively small opening in one glove compartment wall and the size and dimensions of said opening are substantially the same as those of the Peltier element 5 used in order to achieve a very space-saving arrangement. The Peltier element 5 is then placed in the opening in the glove compartment wall, so that no additional space is required. The thickness of the metal plate 4 can be dimensioned in such a way that the aforementioned fixing of the bag 1 with respect to a glove compartment wall can be achieved, whilst taking account of the individual dimensions and wall thicknesses. Thus, the metal plate 4 is not only responsible for the heat conduction between the plate 3 and the Peltier element 5, but simultaneously serves as a variable spacer, so as to provide optimum fitting conditions for each individual case.

What we claim is:
1. An apparatus for cooling a glove compartment in a motor vehicle, wherein
   (a) a flexible bag is arranged in the interior of the glove compartment,
   (b) the walls of the flexible bag have a very low thermal conductivity,
   (c) the bag has a substantially heat-tight-closable opening,
   (d) a plate made from a material with a high thermal conductivity is disposed in the bag and
   (e) the plate is in thermal contact with a Peltier element.
2. An apparatus according to claim 1, wherein the walls of the bag are made from a material with good thermal insulation.
3. An apparatus according to claim 1, wherein the walls of the bag are made from foam material.
4. An apparatus according to claim 1, wherein the walls of the bag have a closed-pore layer, in which honeycomb cells are between several material layers.
5. An apparatus according to claim 1, wherein the bag can be folded up flat.
6. An apparatus according to claim 1, wherein in the unfolded open state the bag takes up virtually the entire interior of the glove compartment.
7. An apparatus according to claim 1, wherein the plate is arranged along a glove compartment wall and a bag wall is secured between the plate and said glove compartment wall.
8. An apparatus according to claim 7, wherein the plate extends over substantially the entire inner surface of said bag wall, which is positioned along the glove compartment wall and is fixed to the latter by the plate.
9. An apparatus according to claim 1, wherein the plate is made from aluminium.
10. An apparatus according to claim 1, wherein the hot side of the Peltier element is connected to a cooling plate located outside the glove compartment.

* * * * *